US010591306B2

United States Patent
High et al.

(10) Patent No.: US 10,591,306 B2
(45) Date of Patent: Mar. 17, 2020

(54) SYSTEMS AND METHODS FOR DELIVERY VEHICLE MONITORING

(71) Applicant: Walmart Apollo, LLC, Bentonville, AR (US)

(72) Inventors: Donald High, Noel, MO (US); Bruce W. Wilkinson, Rogers, AR (US); David Winkle, Bella Vista, AR (US); Matthew Allen Jones, Bentonville, AR (US); Aaron Vasgaard, Fayetteville, AR (US); Nicholaus Adam Jones, Fayetteville, AR (US); Robert James Taylor, Rogers, AR (US); Todd Davenport Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 67 days.

(21) Appl. No.: 15/869,441

(22) Filed: Jan. 12, 2018

(65) Prior Publication Data
US 2018/0195869 A1    Jul. 12, 2018

Related U.S. Application Data

(60) Provisional application No. 62/445,442, filed on Jan. 12, 2017.

(51) Int. Cl.
*G06Q 20/28* (2012.01)
*G01C 21/34* (2006.01)
(Continued)

(52) U.S. Cl.
CPC ....... *G01C 21/343* (2013.01); *G01C 21/3453* (2013.01); *G06Q 10/0832* (2013.01);
(Continued)

(58) Field of Classification Search
CPC .............. G01C 21/343; G01C 21/3453; G06Q 10/0832; G06Q 20/28; G08G 1/0967; G08G 1/202; G08G 1/207; H04W 4/35; B60Q 1/50; B60Q 10/06315; G05D 1/0011; G05D 1/0088; G05D 1/0274; B25J 9/1656
See application file for complete search history.

(56) References Cited

U.S. PATENT DOCUMENTS 5,410,109 A    4/1995   Tarter et al.
6,253,129 B1   6/2001   Jenkins et al.
(Continued)

OTHER PUBLICATIONS

LLarri et al., A Data Management Perspective on Vehicular Networks, 2015, IEEE, p. 2420-2460 (Year: 2015).*
(Continued)

*Primary Examiner* — McDieunel Marc
(74) *Attorney, Agent, or Firm* — McCarter & English, LLP; Daniel R. Burns

(57) ABSTRACT

A monitoring system for items in a delivery vehicle is described. Sensors disposed in the delivery vehicle are configured to sense data indicative of a current quality of items stored in the delivery vehicle. A computing device calculates navigation routes for the items in the vehicle and selects among the delivery routes at least partly based on sensor data relating to the monitored quality of the items.

20 Claims, 5 Drawing Sheets

(51) Int. Cl.
  *G06Q 10/08* (2012.01)
  *G08G 1/0967* (2006.01)
  *H04W 4/35* (2018.01)
  *G08G 1/00* (2006.01)
  *G06Q 50/28* (2012.01)

(52) U.S. Cl.
  CPC ........... *G08G 1/0967* (2013.01); *G08G 1/202* (2013.01); *H04W 4/35* (2018.02); *G06Q 50/28* (2013.01)

(56) References Cited

U.S. PATENT DOCUMENTS

| | | |
|---|---|---|
| 7,177,825 B1 | 2/2007 | Borders et al. |
| 7,339,460 B2 | 3/2008 | Lane et al. |
| 8,095,304 B2 | 1/2012 | Blanton et al. |
| 8,214,141 B2 | 7/2012 | Froeberg |
| 8,880,416 B2 | 11/2014 | Williams et al. |
| 2002/0019759 A1 | 2/2002 | Arunapuram et al. |
| 2013/0144700 A1* | 6/2013 | VanDeburg ........ G06Q 30/0225 705/14.23 |
| 2014/0081445 A1 | 3/2014 | Villamar |
| 2014/0180953 A1 | 6/2014 | Westcott et al. |
| 2015/0095198 A1 | 4/2015 | Eramian |
| 2015/0202770 A1* | 7/2015 | Patron ................... G05D 1/024 700/245 |
| 2015/0278759 A1 | 10/2015 | Harris et al. |
| 2016/0031081 A1* | 2/2016 | Johnson ................ B25J 9/1656 700/250 |
| 2016/0042321 A1 | 2/2016 | Held |
| 2016/0196527 A1 | 7/2016 | Bose et al. |

OTHER PUBLICATIONS

Baguena et al., An Adaptive Anycasting Solution for Crowd Sensing in Vehicular Environments, 2015, IEEE, p. 7911-7919 (Year: 2015).*

French et al., Automatic route control system, 1973, IEEE, 36-41 (Year: 1973).*

International Search Report and Written Opinion for Application No. PCT/US2018/013532, dated Mar. 29, 2018, 9 pages.

* cited by examiner

SYSTEMS AND METHODS FOR DELIVERY VEHICLE MONITORING

RELATED APPLICATION

This application claims priority to U.S. Provisional Application No. 62/445,442 filed on Jan. 12, 2017, the content of which is hereby incorporated by reference in its entirety

BACKGROUND

Delivery vehicles are used to deliver and transport various types of items. Different items on the delivery vehicle have different destinations. Delivery routes may be calculated on a per order basis for each item in the delivery vehicle.

SUMMARY

In one embodiment, a monitoring system for items in a vehicle is provided. The system includes multiple sensors disposed in a vehicle containing two or more items. The sensors are configured to sense data indicative of at least a quality of the two or more items and a current location of the vehicle. The system also includes a computing device equipped with a processor and communicatively coupled to the sensors. The computing device is configured to execute an analysis module and a routing module. When the routing module is executed it determines a first navigation route to deliver a first item of the two or more items. The navigation route is a route between a delivery address for the first item and the current location of the vehicle. The routing module also, when executed, determines a second navigation route to deliver a second item of the two or more items. The second navigation route is a route between a delivery address for the second item and the current location of the vehicle. When the analysis module is executed, it receives the sensed data sensed by the sensors, analyzes order data for each of the two or more items, and analyzes the quality of the first item and the quality of the second item based on the sensed data. The analysis module, when executed, also selects between the first navigation route and the second navigation route based at least in part on the analysis of the quality of the first item and the second item.

In another embodiment, a computer device-implemented method for monitoring items in a vehicle is provided. The method includes receiving sensed data from multiple sensors disposed in a vehicle containing two or more items, where the sensed data is indicative of at least a quality of the two or more items and a current location of the vehicle. The method also includes determining, programmatically, a first navigation route to deliver a first item of the two or more items, where the first navigation route is a route between a delivery address for the first item and the current location of the vehicle. The method further includes determining, programmatically, a second navigation route to deliver a second item of the two or more items, where the second navigation route is a route between a delivery address for the second item and the current location of the vehicle. The method also includes analyzing order data for each of the two or more items, analyzing the quality of the first item and the quality of the second item based on the sensed data, and selecting, programmatically, between the first navigation route and the second navigation route based at least in part on the analysis of the quality of the first item and the second item.

In yet another embodiment, a non-transitory machine readable medium is provided that stores instructions that when executed causes a processor to implement a method for monitoring items in a vehicle. The method includes receiving sensed data from multiple sensors disposed in a vehicle containing two or more items, where the sensed data is indicative of at least a quality of the two or more items and a current location of the vehicle. The method also includes determining, programmatically, a first navigation route to deliver a first item of the two or more items, where the first navigation route is a route between a delivery address for the first item and the current location of the vehicle. The method further includes determining, programmatically, a second navigation route to deliver a second item of the two or more items, where the second navigation route is a route between a delivery address for the second item and the current location of the vehicle. The method also includes analyzing order data for each of the two or more items, analyzing the quality of the first item and the quality of the second item based on the sensed data, and selecting, programmatically, between the first navigation route and the second navigation route based at least in part on the analysis of the quality of the first item and the second item.

BRIEF DESCRIPTION OF DRAWINGS

The accompanying drawings, which are incorporated in and constitute a part of this specification, illustrate one or more embodiments of the invention and, together with the description, help to explain the invention. The embodiments are illustrated by way of example and should not be construed to limit the present disclosure. In the drawings.

DESCRIPTION OF EXEMPLARY EMBODIMENTS

Figure 1:
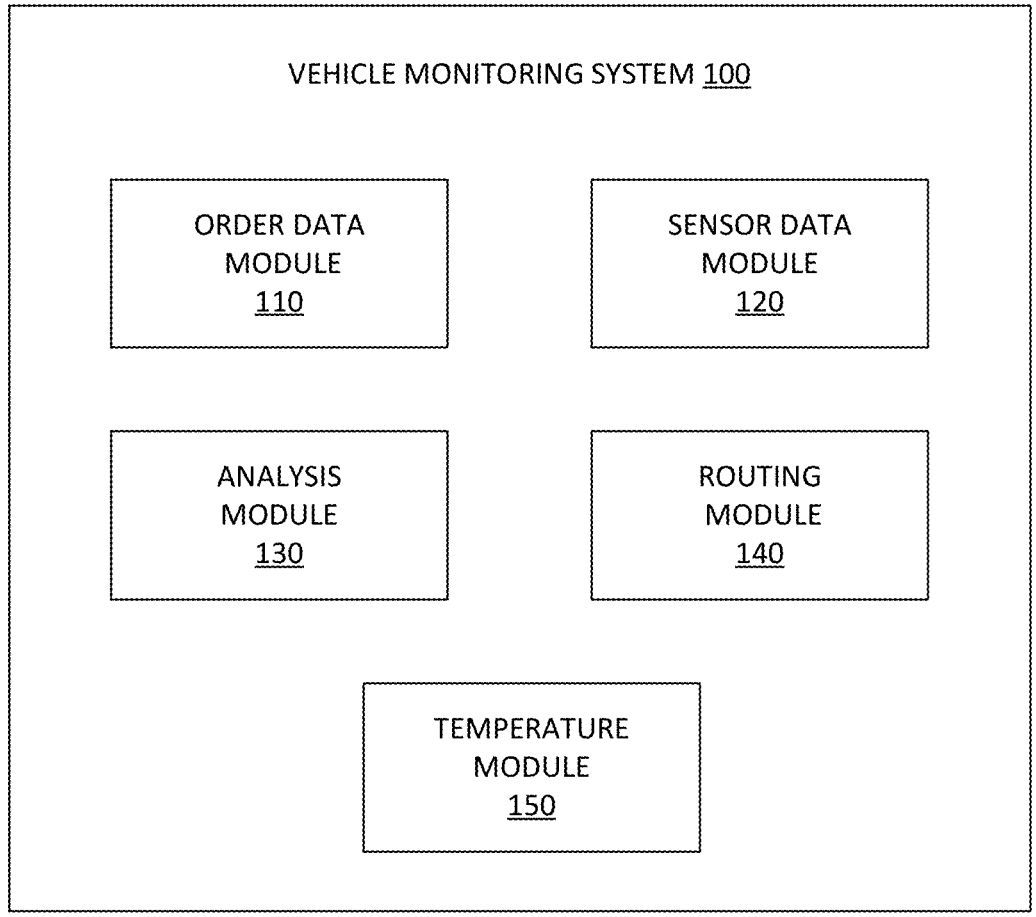
FIG. 1 is a block diagram showing a vehicle monitoring system implemented in modules, according to an example embodiment.

Exemplary embodiments described herein provide a monitoring system for items in a vehicle. An exemplary monitoring system includes multiple sensors disposed in the vehicle, and the vehicle contains multiple items for delivery. The sensors sense data indicative of at least quality of the items in the vehicle and a location of the vehicle. A computing device determines a navigation route for delivering each of the items in the vehicle. The quality of items is analyzed, and navigation routes are selected for delivering respective items based on analysis of the quality of the items. In this manner, the vehicle monitoring system described herein continually monitors the quality of the items in the vehicle, and determines an order of delivery for the items based at least on the quality of the items.

In an example embodiment, the vehicle is a delivery vehicle. For example, the vehicle may be a home-delivery vehicle. In one embodiment, the vehicle is a delivery vehicle for perishable items. Perishable items or food are likely to spoil, decay or become unsafe to consume if they are not kept at a certain temperature. Perishable items, include but are not limited to, produce (fruit, vegetables, etc.), meat, seafood, dairy, hot food items, frozen food items, refrigerated food items, prepared food items, flowers, plants, and the like. The delivery vehicle may also deliver items or food that a consumer expects to be of a certain quality or freshness.

An order can include one or more items. The order may be fulfilled from any source such as a retail store, and picked up by the driver of the delivery vehicle. The order may be delivered to a customer at a delivery address, such as his or her home or office. The order may also be delivered to another store or another location for pick-up by a customer. In an example embodiment, the order may be delivered to the customer's vehicle based on receiving the location of the customer's vehicle from a GPS in the vehicle or a computing device being used by the customer. In one embodiment, the location of the customer's vehicle may be tracked to determine if the customer will be available to receive the delivery at the delivery address at an estimated delivery time.

The delivery vehicle may be configured to satisfy compliance standards for storing and/or transporting perishable items. For example, the delivery vehicle may include a refrigeration unit and/or a heating unit to keep items cold or hot according to compliance standards. In one embodiment, the data sensed by the sensors disposed in the vehicle includes temperature data. If the temperature of the item, the refrigeration unit or heating unit is not within a prescribed range, then the refrigeration unit or the heating unit may be automatically activated pursuant to a command from a local or remotely located computing device informed of the temperature reading to adjust the temperature according to the prescribed range. The refrigeration unit or the heating unit may be activated via a computing device installed in the vehicle and coupled to the refrigeration unit or the heating unit.

The multiple sensors disposed in the vehicle may sense various characteristics of the vehicle and the items in the vehicle. In one embodiment, if the sensed data indicates an item is damaged, then an alert is generated at a computing device installed in the vehicle or used by the driver of the vehicle. The alert may indicate to the driver that the item should not be delivered since it is damaged.

FIG. 1 is a block diagram showing a vehicle monitoring system 100 in terms of functional modules according to an example embodiment. The modules may include an order data module 110, a sensor data module 120, an analysis module 130, a routing module 140, and a temperature module 150. One or more of the modules of system 100 may be implemented in device 410 or server 430 of FIG. 4. The modules may include various circuits, circuitry and one or more software components, programs, applications, or other units of code base or instructions configured to be executed by one or more processors included in device 410 or server 430. Although modules 110, 120, 130, 140, and 150 are shown as distinct modules in FIG. 1, it should be understood that modules 110, 120, 130, 140, and 150 may be implemented as fewer or more modules than illustrated. It should be understood that modules 110, 120, 130, 140, and 150 may communicate with one or more components included in system 400 (FIG. 4), such as device 410, device 415, sensors 420, server 430 or database(s) 440.

In one embodiment, the order data module 110 may be configured to manage data, for example, pickup address, delivery address, item or items in the order, customer name, etc., for one or more orders placed by customers. The order data module 110 may also be configured to manage item data, for example, item name, optimum quality for item, optimum temperature for item, etc. In one embodiment, the order data module 110 may also facilitate fulfillment of orders placed by customers, for example, by generating and transmitting order fulfillment requests to a computing device at a store that has enough stock to fulfill the order. In one embodiment, the order data module 110 is included at a computing device (e.g., device 410) or a server (e.g., server 430).

In one embodiment, the sensor data module 120 may be configured to manage data sensed by the multiple sensors (e.g., sensors 420) disposed in the vehicle. The data sensed by the sensors may include location data, freshness data of an item, quality data of an item, temperature data, and the like. The sensors disposed in the vehicle may include a weight sensor, a pressure sensor, a temperature sensor, a thermal imaging sensor (such as a thermal camera), an off-gassing sensor, a color sensor, a moisture sensor, an acoustic sensor, a location sensor, identifier sensors (e.g., optical label scanner/reader, RFID reader, etc.) and other sensors. In one embodiment, the sensor data module 120 is included at a computing device (e.g., device 410) or a server (e.g., server 430) either within the delivery vehicle or remotely located from the delivery vehicle. An acoustic sensor may be used to determine if an item is broken or damaged. A thermal imaging sensor may be used to visually determine item temperature.

In one embodiment, the analysis module 130 may be configured to analyze sensed data and order data, and determines delivery time and delivery order for each item. In one embodiment, the delivery time for each item may be constantly updated based on at least the sensed data or data related to other factors, such as road traffic, weather, customer availability, and the like. In one embodiment, the analysis module 130 is included at a computing device (e.g., device 410) or a server (e.g., server 430).

In one embodiment, the routing module 140 may be configured to manage and analyze location data for the vehicle and a delivery address from order data. The routing module 140 may generate a navigation route between the location of the vehicle and a delivery address for each order of items. The routing module 140 may update the navigation route based on an update in delivery address. The routing module 140 may also generate a navigation route between the location of the vehicle and a pick-up address for an order. In one embodiment, the routing module 140 is included at a computing device (e.g., device 410) or a server (e.g., server 430).

In one embodiment, the temperature module 150 may be configured to manage and analyze data sensed by temperature sensors disposed at a refrigeration unit and/or heating unit included in the vehicle. The temperature module 150 may automatically cause the refrigeration unit or heating unit to turn on or off based on the sensed temperature being within or not within a pre-defined range of temperature. The pre-defined range of temperature may be determined based on the type of item stored in the refrigeration or heating unit. In one embodiment, the temperature module 150 is included at a computing device (e.g., device 410) or a server (e.g., server 430).

Figure 2:
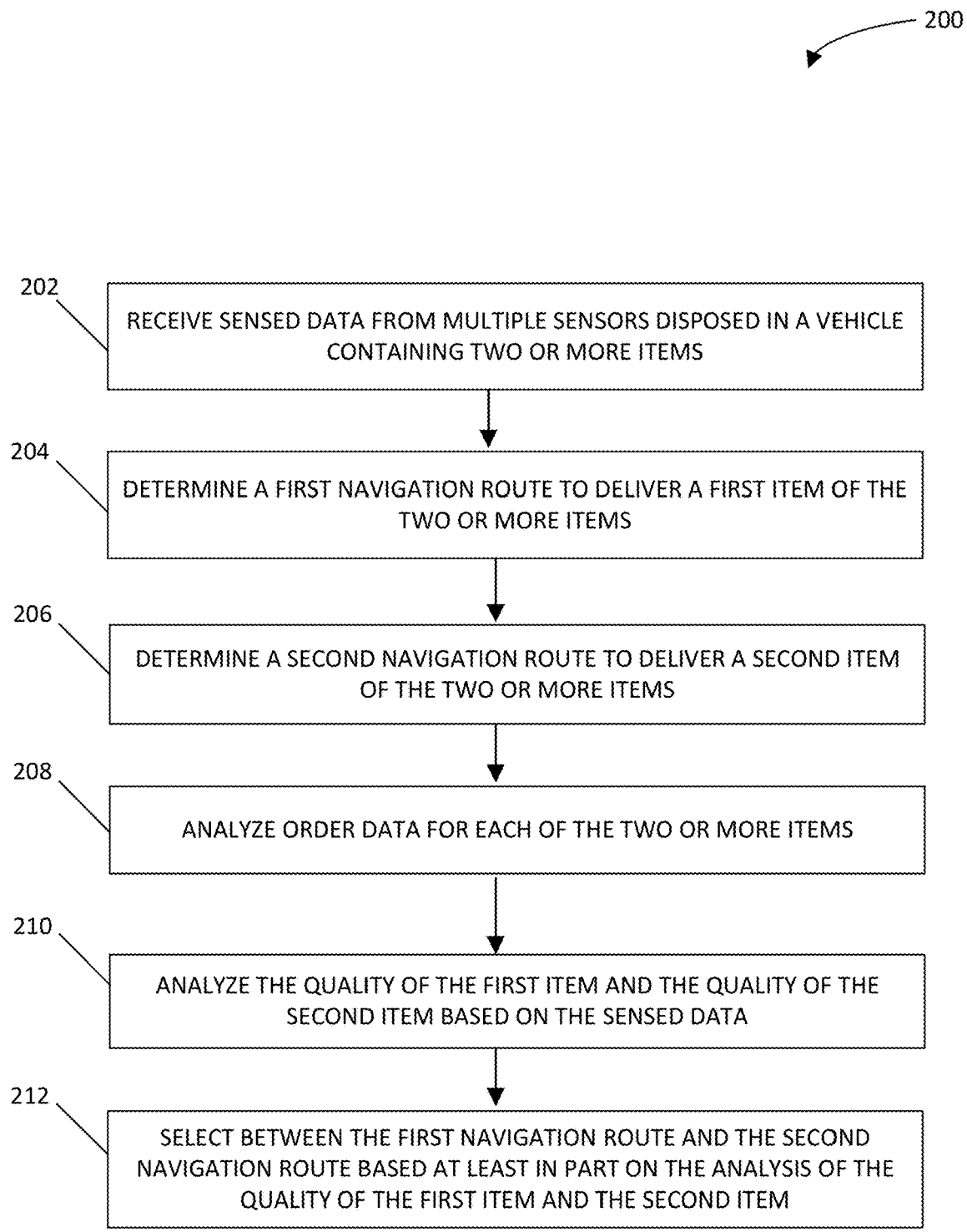
FIG. 2 is a flowchart showing an exemplary method for monitoring items in a vehicle, according to an example embodiment.

FIG. 2 is a flowchart showing an exemplary method 200 for monitoring items in a vehicle, according to an example embodiment. The steps of method 200 may be performed by one or more modules shown in FIG. 1. It will be appreciated that the method is programmatically performed by one or more computer-executable processes executing on, or in communication with, one or more computing systems or processors described further below.

At step 202, the analysis module 130 receives sensed data from one or more sensors disposed in a vehicle containing two or more items. The sensors disposed in the vehicle may include a weight sensor, a pressure sensor, a temperature sensor, a thermal imaging sensor, an off-gassing sensor, a color sensor, a moisture sensor, an acoustic sensor, a location sensor, identifier readers (e.g., optical label scanner/reader, RFID reader, etc.) and other sensors. The sensors may be disposed at predetermined locations in the vehicle.

At step 204, the routing module 140 determines a first navigation route to deliver a first item of the two or more items. The first navigation route can be a route between a delivery address for the first item and the current location of the vehicle.

At step 206, the routing module 140 determines a second navigation route to deliver a second item of the two or more items. The second navigation route can be a route between a delivery address for the second item and the current location of the vehicle. The current location of the vehicle may be sensed by one or more sensors disposed in the vehicle. The delivery address for the first item and the second item may be retrieved by the routing module 140 from the order data for the respective items. The routing module 140 may also estimate a delivery time for the respective items. The routing module 140 can use industry standard methods for generating a navigation route for the vehicle to deliver the items.

At step 208, the analysis module 130 retrieves and analyzes order data for each of the two or more items. The order data can include customer data, item data, delivery address, pickup address, transaction amount, requested delivery time, and the like. The order data may also include, as part of the item data, an optimum level of freshness, a desired level of freshness, an expiration date or time, an optimum temperature, and other data related to desired or required quality of the item.

At step 210, the analysis module 130 analyzes the quality of the first item and the quality of the second item based on the sensed data. The sensed data may include data indicative of quality or freshness of an item, for example, moisture properties, off-gassing properties, temperature, weight, color, and the like.

At step 212, the analysis module 130 selects between the first navigation route and the second navigation route based at least in part on the analysis of the quality of the first item and the second item. In this manner, the analysis module 130 selects an order for delivery of items based on the freshness or quality of the items. For example, if the quality of the first item is lower than the quality of the second item, then the first item is selected for delivery first. Some items for delivery may have a short-shelf life or short time period of optimum freshness or quality. These items may be selected by the analysis module 130 to be delivered before other items to ensure the customer receives items at an optimum quality. The analysis module 130 may retrieve and analyze an expiration date or time for each of the items in the vehicle, and selects between the first navigation route and the second navigation route based at least in part on the expiration date or time.

In one embodiment, the analysis module 130 retrieves and analyzes external factors including at least one of weather conditions and traffic conditions. The analysis module 130 may select between the first navigation route and the second navigation route based at least in part on the external factors.

The order data may include a transaction amount, and the analysis module 130 may select between the first navigation route and the second navigation route based at least in part on the transaction amount. The order data may include a loyalty factor for a customer, and the analysis module 130 may select between the first navigation route and the second navigation route based at least in part on the loyalty factor. The loyalty factor for a customer may be based on the years a person has been customer. The loyalty factor for a customer may also be based on the number of orders the customer places in a given period of time. Using the transaction amount or customer loyalty factor to select a delivery order of the items in the vehicle, allows the analysis module 130 to consider additional factors when determining delivery order. For example, late delivery of items to a loyal customer may result in loss of the customer, and late delivery of an order with a large transaction amount may result in loss of profits from that transaction. If an order must be altered, the analysis module 130 may programmatically determine which order is more beneficial.

In an example embodiment, the analysis module 130 analyzes the sensed data and may determine that an item in the vehicle is damaged. If an item is determined to be damaged, then the analysis module 130 may transmit a message indicating cancellation of delivery for the damaged item. The message may be transmitted to the order data module 110 at a computing device at a facility (e.g., device 410) or a server at a facility (e.g., 430). The message may also be transmitted to a user or customer device (e.g., device 415) and/or the driver of the delivery vehicle.

In an example embodiment, the vehicle includes a storage container coupled to a cooling mechanism, and the storage container may contain one or more items for delivery. The temperature module 150 analyzes the sensed data to determine an interior temperature of the storage container, and compares the interior temperature with a predefined temperature. When the interior temperature is higher than the predefined temperature, the temperature module 150 automatically adjusts the cooling mechanism of the storage container to lower the interior temperature.

In an example embodiment, the vehicle includes a storage container coupled to a heating mechanism and a temperature sensor, and the storage container may contain one or more items for delivery. The temperature module 150 analyzes the sensed data to determine an interior temperature of the storage container, and compares the interior temperature with a predefined temperature. When the interior temperature is lower than the predefined temperature, the temperature module 150 automatically adjusts the heating mechanism of the storage container to raise the interior temperature. The storage container may also be coupled to a moisture sensor to sense the moisture within the storage container, so that the item stored in the storage container does not become dry or overly moist.

The sensors may be arranged in the vehicle or the storage container as a sensing grid or matrix. The sensing grid or matrix may include weight sensors that are configured to sense a weight differential of an item placed in the vehicle or the storage container. Using the weight differential, the vehicle monitoring system 100 is able to accurately determine (using known weight of an item) displacement of an item due to driving movement, and the like.

Figure 3:
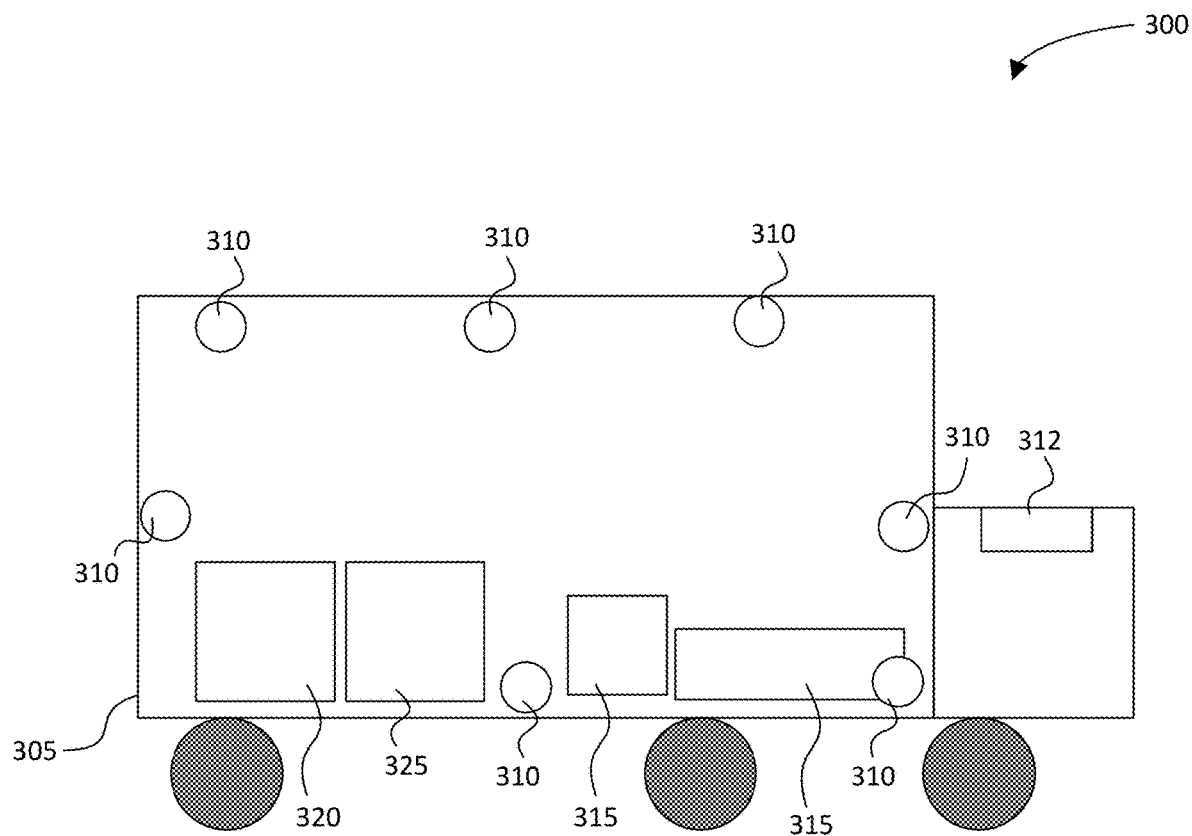
FIG. 3 is a schematic showing an exemplary vehicle monitoring system, according to an example embodiment.

FIG. 3 is a schematic showing an exemplary vehicle monitoring system 300, according to an example embodiment. As shown, multiple sensors 310 are disposed at various locations in a vehicle 305. The sensors may include, but are not limited to, a weight sensor, a pressure sensor, a temperature sensor, a thermal imaging sensor, an off-gassing sensor, a color sensor, a moisture sensor, an acoustic sensor, a location sensor, an identifier reader (e.g., optical label reader, RFID reader, etc.). In an example embodiment, the vehicle 305 may also include a global positioning system (GPS) 312. The vehicle 305 may also include a computing device (e.g., device 410). The vehicle 305 contains multiple items 315 for delivery or transport. In an example embodiment, the vehicle 305 also includes a refrigeration unit 320 and a heating unit 325 that may be operatively coupled to a computing device in the vehicle 305, and may be used to store one or more items. The refrigeration unit 320 and heating unit 325 may be automatically controlled to maintain a specific temperature for the items stored therewithin.

In one embodiment, the vehicle includes two or more sensor arrays for measuring various conditions in the vehicle. The first array of sensors may be arranged as multiple individual sensor strips (in one example square in shape) extending along a floor surface of the vehicle and defining a sensing grid or matrix. The first array of sensors may also be in the form of lengthy rectangular sensor strips extending along a wall or floor of the vehicle. In one form, the floor surface is covered with an appropriate first array of sensors with sufficient discrimination and resolution so that, in combination, the sensors are able to identify the quantity (and/or the type) of items in the vehicle. The first array of sensors may also be arranged within or on a storage container disposed in the vehicle to form a sensing grid or matrix.

In one embodiment, the first array of sensors may be formed of piezoelectric material. Piezoelectric sensors are sensors that can measure various characteristics, including pressure, force, and temperature and do not need to be replaced frequently. Although piezoelectric sensors are one suitable sensor type other sensor types may also be used, such as, in a non-limiting example, other types of pressure/weight sensors (load cells, strain gauges, etc.).

The second array of sensors may be configured to measure at least one of weight, pressure, temperature, and moisture. The second array of sensors may be arranged on one or more side wall (or vertical) surfaces of the vehicle. It may be desirable to mount the second array of sensors on more than a side surface so as to generate more data points or sensory data to better monitor conditions of the items. Some or all of the surfaces of the interior of the vehicle may include sensor arrays so as to define a number of "smart" surfaces.

In one embodiment, the second array of sensors may be arranged in a similar manner along one or more side surfaces as the first array of sensors is arranged along the floor surface. For example, the second array of sensors may be arranged as multiple individual sensor strips that collectively define a grid. Further, this second array of sensors may also be formed of piezoelectric material.

The second array of sensors may be temperature sensors that are positioned at different heights along one or more side surfaces. Under this approach, the first array of sensors may be directed to collecting weight data at the floor surface of the vehicle, while the second array of sensors is directed to collecting temperature data. The type of sensor in the first and second arrays may be selected so that each array collects a certain type of data that complements the data collected by the other array.

The second array of sensors may include gas emission sensors. These types of sensors are useful in detecting chemicals that may be associated with the deteriorating condition of certain perishable items. Gas emission sensors may also be incorporated into the first array of sensors.

In one embodiment, a third array of sensors may include one or more optical cameras (although other sensor types may also be used). The third array of sensors may include charged-coupled devices, also referred to as CCD camera(s). These digital imaging devices may be selected to be relatively small in size and provide relatively high-quality image data. Alternatively, active-pixel sensors (APS) may also be used (which include CMOS APS sensors). These sensors generally provide lower quality image data but may be less expensive than CCD sensors and use less power. The optical cameras are positioned within or on the vehicle to be able to view the items.

In one embodiment, the third array of sensors is configured to identify the type or orientation of item, and this identification may be done in several different ways. For example, regarding type, the third array of sensors may be configured to capture images and thereby read barcode labels, recognize text, or recognize color of the item, and/or the third array of sensors may detect RFID tags. In one form, this image data may be compared to item images in an image database to identify the item. As another example, regarding orientation, the third array of sensors may be configured to capture images that show if the item is front facing (as may be desirable), offset with respect to front facing, or may be knocked over and lying on a side.

In one embodiment, the vehicle includes shelves to hold the items. The shelf may include a bottom surface and side surfaces, a first array of sensors arranged on the bottom surface of the shelf and configured to measure at least one of weight, pressure, temperature, and moisture, and a second array of sensors arranged on one or more side surfaces of the shelf and configured to measure at least one of weight, pressure, temperature, and moisture. An interface may be operatively coupled to the arrays of sensors, and configured to transmit sensor data from the arrays to a computing device. In one embodiment, the sensor data may first be transmitted from the sensors to a computing device in the delivery vehicle and then transmitted to a remote computing device executing the analysis and routing modules described herein.

In one form, the first array of sensors may include multiple individual strips defining a grid extending along the bottom surface of a shelf in the delivery vehicle. In some embodiments, the sensors may be built into the shelf itself or may be incorporated into a liner or mat supported by the shelf. Further, the first array of sensors may be formed of piezoelectric material and may be configured to measure weight, pressure, temperature, and moisture at predetermined locations along the bottom surface of the shelf. In addition, the second array of sensors may be disposed at predetermined vertical positions along at least one side surface of the shelf. Also, the second array of sensors may include individual strips defining a grid extending along the at least one side surface of the shelf. Moreover, the first array or second array of sensors may include at least one gas emission sensor.

In one embodiment, the interface may include an RFID device with a memory having a predetermined number of bits equaling the number of sensors in the first array of sensors, and each bit may correspond to a sensor in the first array of sensors. A third array of sensors may be disposed at predetermined vertical positions. In addition, the third array of sensors may be disposed at a top surface of the shelf. Also, the third array of sensors may include one or more optical sensors. The one or more optical sensors may include one or more CCD cameras configured to identify the type or orientation of item based on at least one of barcode labels, RFID tags, text recognition, or color recognition.

The RFID device may have a memory having a predetermined number of bits equaling the number of sensors in the first array of sensors where each bit corresponds to a sensor in the first array of sensors. For example, the first array of sensors may be a 16×16 grid that defines a total of 256 individual sensors, and the first array of sensors may be coupled to a 256 bit RFID device such that each individual sensor corresponds to an individual bit. In addition, the second array of sensors may be arranged in a similar manner. In other words, they may collectively define a 16×16 grid that is coupled to a 256-bit RFID device. As should be evident, these are just examples, and other array arrangements are possible where there is a 1:1 correspondence between individual sensors and bits of an RFID or memory device.

In one embodiment, an RFID device including a 256 bit memory may be configured to store the location information of the shelf 102 in the shopping facility and location information of items on the shelf 102. Based on detected changes in pressure, weight, and/or temperature, the sensor 109 may configure the corresponding bit of the memory located in the RFID device (as a logic "1" or a logic "0"). The RFID device may then transmit the location of the shelf 102 and data corresponding to changes in the memory to the central computing system.

The analysis module may evaluate item freshness levels, particularly for perishable items. When the analysis module 130 receives sensor data, it may combine it with the sensor reading history and with specific information regarding the item from the database 440. For example, the item information may include data about the item, such as shelf life, to be evaluated in conjunction with sensor readings to facilitate the calculation of a sell-by date, an estimated expiration date, and/or a stage of ripeness or freshness. In some forms, the analysis module 130 may determine information regarding the ripeness or freshness left on an item based on predictive comparisons of other similar items. In some embodiments, the computing device may use other known methods to determine the estimated expiration date and/or stage of freshness.

In one embodiment, the sensors are arranged to detect color or texture changes in the items. For example, the arrangement of sensors may include optical sensors (such as in a third array of sensors) that capture image data of the item. The color and/or texture of certain perishable items, including, for example, certain meat and fruit (such as pears and apples), will change over time. However, non-perishable items may also exhibit color changes over time, such as due to fading over time when exposed to sunlight. The optical sensors can take continuous video or still images at certain time intervals, which show the color or texture of the items over time and the changes in color or texture. This image data can be compared to preexisting image data from the database 440 for that particular item that may be associated with preexisting remaining shelf life predictions for the item. Thus, the computing device may be configured to analyze item freshness levels based on the analysis of sensor data over a predetermined amount of time for color or texture changes of the item to determine shelf life.

In another example, the arrangement of sensors may include gas emission sensors (such as in a second array of sensors) that detect gas emissions of chemicals from the item indicating a change in freshness. Certain fruit and other perishable items will emit chemicals indicating ever-decreasing shelf life. The gas emission data can be compared to preexisting data from the database 440 for that particular item that may be associated with preexisting shelf life predictions for that item. The analysis module 130 may be configured to analyze item freshness levels based on the analysis of the gas emission data over a predetermined amount of time for chemical changes in the item to determine shelf life.

Figure 4:
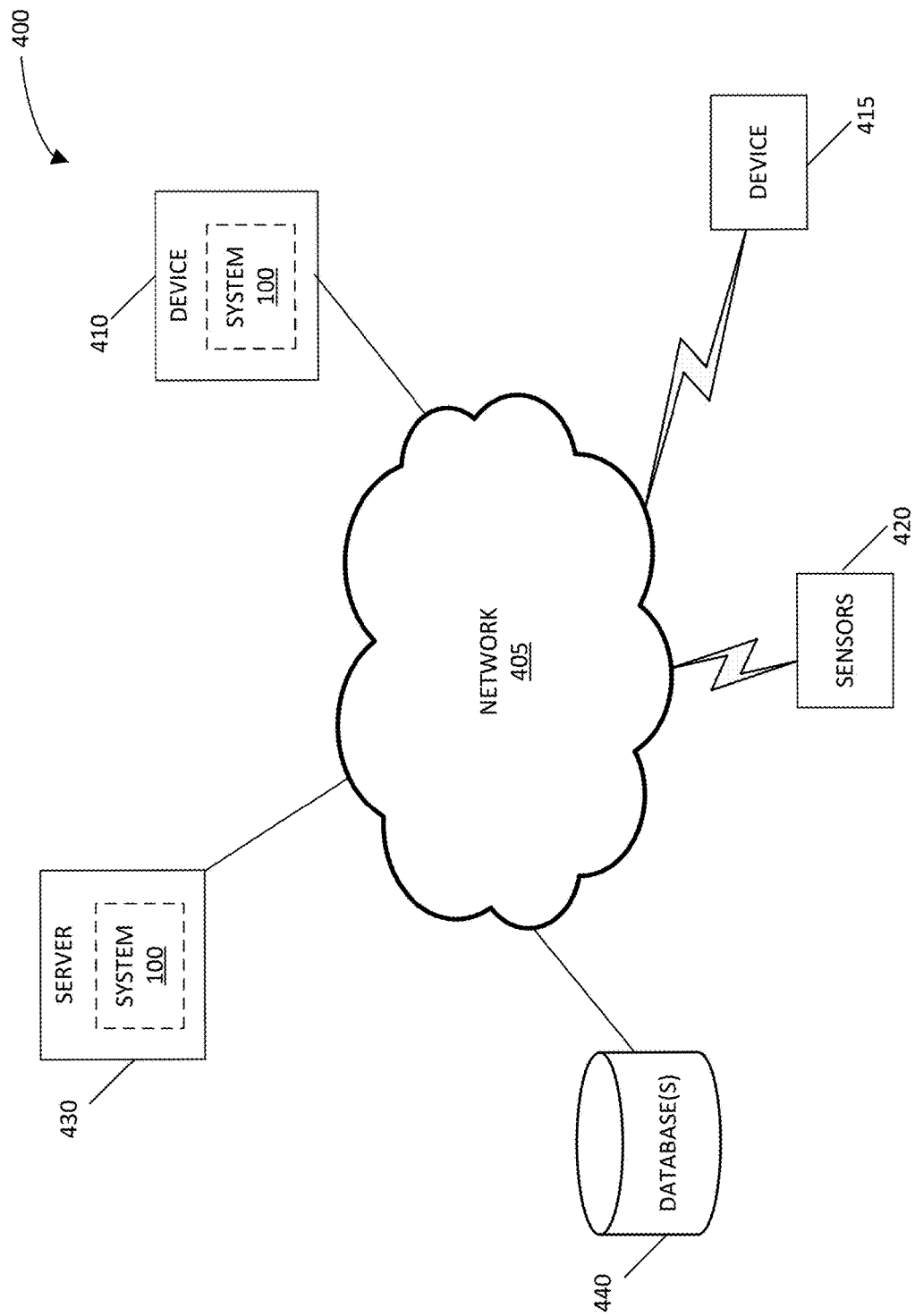
FIG. 4 illustrates a network diagram depicting a system for implementing the vehicle monitoring system, according to an example embodiment.

FIG. 4 illustrates a network diagram depicting a system 400 for implementing the vehicle monitoring system, according to an example embodiment. The system 400 can include one or more networks 405 (only 1 network is shown in FIG. 4), multiple devices, for example device 410 and a device 415, multiple sensors 420, a server 430, and database (s) 440. Each of components 410, 415, 420, 430, and 440 in communication, directly or indirectly, with the network 405. It will be appreciated that the depicted components may be combined in combinations other than those illustrated herein without departing from the scope of the present invention. For example, the functionality of the device 410 and server 430 may be combined in a single computing system or device.

In an example embodiment, one or more portions of network 405 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The device 410, 415 may include, but is not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, computing device installed in a vehicle, a vehicle navigation and computing system, and the like. The device 410 can include one or more components described in relation to computing device 500 shown in FIG. 5.

The device 410, 415 may connect to network 405 via a wired or wireless connection. In an example embodiment, the device 410 may include one or more applications such as, but not limited to, all or portions of the vehicle monitoring system 100 described herein, and may be used to select between delivery of a first item and a second item. In an example embodiment, the device 415 may be a customer device or user device that may be used to place an order for delivery of items. The location of the customer device or user device 415 (via a GPS included in device 415) may be used to deliver one or more items to a customer at his or her location.

In an example embodiment, some of the components of the vehicle monitoring system 100 may be included in the device 410, while the other components are included in a remotely located server 430. Some of the functionalities of the vehicle monitoring system described herein may be performed by the device 410. In one embodiment, the analysis module and/or routing module described herein may be located at a remote server 430 that receives data from the sensors in the delivery vehicle over a network. In another embodiment, the analysis module and/or routing module may execute on a computing device in the delivery vehicle which receives order data and other information from a remote server over a network. It will be appreciated that other configurations are also possible within the scope of the present invention.

The sensors 420 disposed in the vehicle may include a weight sensor, a pressure sensor, a temperature sensor, a thermal imaging sensor, an off-gassing sensor, a color sensor, a moisture sensor, an acoustic sensor, a location sensor, identifier sensors (e.g., optical label scanner/reader, RFID reader, etc.), an image capturing device, an optical sensor, a humidity sensor, and other sensors.

Each of the database(s) 440 and server 430 may be connected to the network 405 via a wired or wireless connection. The server 430 may include one or more computing devices or processors configured to communicate with the device 410, the device 415, the sensors 420, and database(s) 440 via network 405. The server 430 hosts one or more applications or websites accessed by the device 410, 415 and/or to facilitate access to the content of database(s) 440. Database(s) 440 may include one or more storage devices for storing data and/or instructions (or code) for use by the device 410, 415 and server 430, such as data sensed by the sensors 420, order data, item data, pickup and delivery locations, and the like. Database(s) 440, and/or server 430, may be located at one or more geographically distributed locations from each other or from the device 410. Alternatively, database(s) 440 may be included within server 430.

Figure 5:
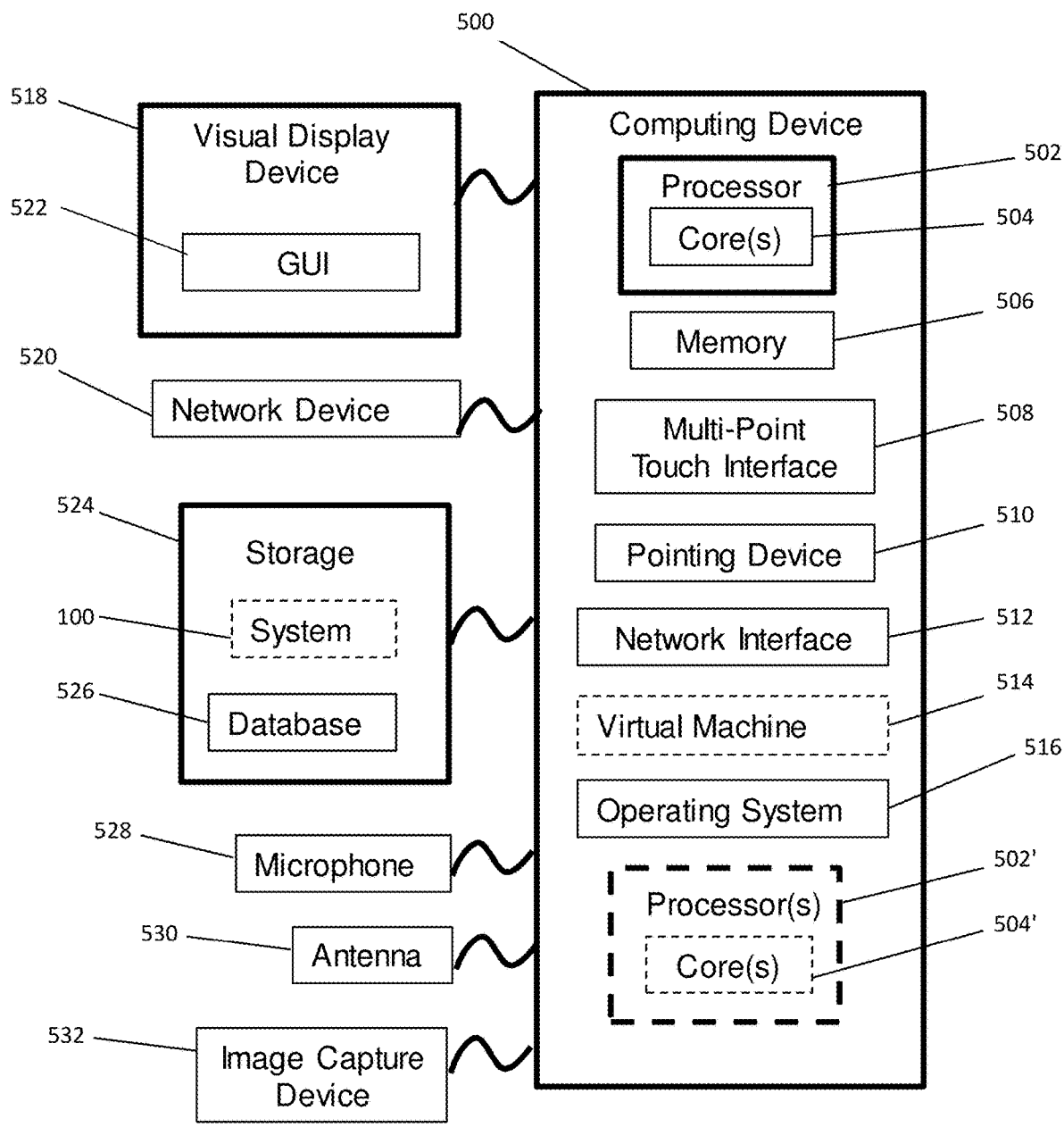
FIG. 5 is a block diagram of an exemplary computing device that can be used to implement exemplary embodiments of the vehicle monitoring system described herein.

FIG. 5 is a block diagram of an exemplary computing device 500 that may be used to implement exemplary embodiments of the vehicle monitoring system 100 described herein. The computing device 500 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 506 included in the computing device 500 may store computer-readable and computer-executable instructions or software for implementing exemplary embodiments of the vehicle monitoring system 100. The computing device 500 also includes configurable and/or programmable processor 502 and associated core 504, and optionally, one or more additional configurable and/or programmable processor(s) 502' and associated core(s) 504' (for example, in the case of computer systems having multiple processors/cores), for executing computer-readable and computer-executable instructions or software stored in the memory 506 and other programs for controlling system hardware. Exemplary instructions may include the routing module and the analysis module as described herein. Processor 502 and processor(s) 502' may each be a single core processor or multiple core (504 and 504') processor.

Virtualization may be employed in the computing device 500 so that infrastructure and resources in the computing device may be shared dynamically. A virtual machine 514 may be provided to handle a process running on multiple processors so that the process appears to be using only one computing resource rather than multiple computing resources. Multiple virtual machines may also be used with one processor.

Memory 506 may include a computer system memory or random access memory, such as DRAM, SRAM, EDO RAM, and the like. Memory 506 may include other types of memory as well, or combinations thereof.

A user may interact with the computing device 500 through a visual display device 518, such as a computer monitor, which may display one or more graphical user interfaces 522 that may be provided in accordance with exemplary embodiments. The computing device 500 may include other I/O devices for receiving input from a user, for example, a keyboard or any suitable multi-point touch interface 508, a pointing device 510 (e.g., a mouse), a microphone 528, and/or an image capturing device 532 (e.g., a camera or scanner). The multi-point touch interface 508 (e.g., keyboard, pin pad, scanner, touch-screen, etc.) and the pointing device 510 (e.g., mouse, stylus pen, etc.) may be coupled to the visual display device 518. The computing device 500 may include other suitable conventional I/O peripherals.

The computing device 500 may also include one or more storage devices 524, such as a hard-drive, CD-ROM, or other computer readable media, for storing data and computer-readable instructions and/or software that implement exemplary embodiments of the vehicle monitoring system 100 described herein. Exemplary storage device 524 may also store one or more databases for storing any suitable information required to implement exemplary embodiments. For example, exemplary storage device 524 can store one or more databases 526 for storing information, such as data sensed by the sensors 420, order data, item data, pickup and delivery addresses, and/or any other information to be used by embodiments of the system 100. The databases may be updated manually or automatically at any suitable time to add, delete, and/or update one or more items in the databases.

The computing device 500 can include a network interface 512 configured to interface via one or more network devices 520 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing device 500 can include one or more antennas 530 to facilitate wireless communication (e.g., via the network interface) between the computing device 500 and a network. The network interface 512 may include a built-in network adapter, network interface card, PCMCIA network card, card bus network adapter, wireless network adapter, USB network adapter, modem or any other device suitable for interfacing the computing device 500 to any type of network capable of communication and performing the operations described herein. Moreover, the computing device 500 may be any computer system, such as a workstation, desktop computer, server, laptop, handheld computer, tablet computer (e.g., the iPad™ tablet computer), mobile computing or communication device (e.g., the iPhone™ communication device), internal corporate devices, computing devices installed in a vehicle, or other form of computing or telecommunications device that is capable of communication and that has sufficient processor power and memory capacity to perform the operations described herein.

The computing device 500 may run operating system 516, such as versions of the Microsoft® Windows® operating system, different releases of the Unix and Linux operating systems, versions of the MacOS® for Macintosh computers, embedded operating systems, real-time operating systems, open source operating systems, proprietary operating systems, or other operating systems capable of running on the computing device and performing the operations described herein. In exemplary embodiments, the operating system 516 may be run in native mode or emulated mode. In an exemplary embodiment, the operating system 516 may be run on one or more cloud machine instances.

In one embodiment, the delivery vehicle described herein may be a driverless automated vehicle for delivering items. For example, the driverless vehicle may include a computing device (for example, device 410 or device 415) using artificial intelligence that enables the driverless vehicle to navigate routes and perform other driving tasks. In another embodiment, the driverless vehicle may be operated and controlled at least in part by a remote user. The computing device also performs one or more functionalities of the monitoring system described herein. In an example embodiment, if the sensed data indicates an item is damaged, then an alert is generated indicating that the damaged item should not be delivered, and causes the driverless vehicle to skip delivery of the damaged item. In an example embodiment, the driverless vehicle can automatically control the heating unit and/or refrigeration unit installed in the vehicle to adjust the temperature of items to be within a prescribed range.

The following description is presented to enable persons skilled in the art to create and use a computer system configuration and related method and article of manufacture for a vehicle monitoring system. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A monitoring system for items in a delivery vehicle, the system comprising:
   a plurality of sensors disposed in a vehicle containing two or more perishable food items and configured to sense data indicative of at least one of a moisture property, off-gassing property, temperature, weight or color of the two or more perishable food items and a current location of the vehicle; and
   a computing device equipped with a processor and communicatively coupled to the sensors, the computing device configured to execute an analysis module and a routing module,
   wherein the routing module when executed:
      determines a first navigation route to deliver a first item of the two or more perishable food items, the navigation route being a route between a delivery address for the first item and the current location of the vehicle, and
      determines a second navigation route to deliver a second item of the two or more perishable food items, the second navigation route being a route between a delivery address for the second item and the current location of the vehicle,
   and wherein the analysis module when executed:
      receives the sensed data sensed by the sensors,
      analyzes order data for each of the two or more perishable food items,
      analyzes a quality of the first item and the quality of the second item based on the sensed data, and
      selects between the first navigation route and the second navigation route based at least in part on the analysis of the quality of the first item and the second item.

2. The system of claim 1, wherein the analysis module when executed:
   retrieves and analyzes external factors including at least one of weather conditions and traffic conditions,
   selects between the first navigation route and the second navigation route based at least in part on the external factors.

3. The system of claim 1, wherein the plurality of sensors include at least one of a weight sensor, a pressure sensor, a temperature sensor, a thermal imaging sensor, an off-gassing sensor, a color sensor, a moisture sensor, an acoustic sensor, and a location sensor disposed at predetermined locations in the vehicle.

4. The system of claim 1, wherein the analysis module is further configured to:
   analyze the sensed data;
   determine that one of the two or more perishable food items is damaged; and
   transmit a message indicating cancellation of delivery for the damaged item.

5. The system of claim 1, wherein the order data includes a transaction amount, and the analysis module selects between the first navigation route and the second navigation route based at least in part on the transaction amount.

6. The system of claim 1, wherein the order data includes a loyalty factor for a customer, and the analysis module selects between the first navigation route and the second navigation route based at least in part on the loyalty factor.

7. The system of claim 1, wherein the delivery vehicle is a driverless automated vehicle.

8. The system of claim 1, wherein the analysis module is further configured to:
   retrieve and analyze an expiration date and time for each of the two or more perishable food items, and select between the first navigation route and the second navigation route based at least in part on the expiration date and time.

9. The system of claim 1, further comprising
a storage container in the vehicle, the storage container coupled to a cooling mechanism and containing at least one of the two or more perishable food items; and
a temperature module executed by the computing device and configured to:
analyze the sensed data to determine an interior temperature of the storage container,
compare the interior temperature with a predefined temperature, and
automatically activate the cooling mechanism of the storage container when the interior temperature is higher than the predefined temperature.

10. A computing device-implemented method for monitoring perishable food items in a delivery vehicle, the method comprising:
receiving sensed data from a plurality of sensors disposed in a vehicle containing two or more perishable food items, the sensed data indicative of at least one of a moisture property, off-gassing property, temperature, weight or color of the two or more perishable food items and a current location of the vehicle;
determining, programmatically, a first navigation route to deliver a first item of the two or more perishable food items, the first navigation route being a route between a delivery address for the first item and the current location of the vehicle;
determining, programmatically, a second navigation route to deliver a second item of the two or more perishable food items, the second navigation route being a route between a delivery address for the second item and the current location of the vehicle;
analyzing order data for each of the two or more items;
analyzing a quality of the first item and the quality of the second item based on the sensed data; and
selecting, programmatically, between the first navigation route and the second navigation route based at least in part on the analysis of the quality of the first item and the second item.

11. The method of claim 10, further comprising:
retrieving and analyzing external factors including at least one of weather conditions and traffic conditions, and
selecting programmatically between the first navigation route and the second navigation route based at least in part on the external factors.

12. The method of claim 10, wherein the plurality of sensors include at least one of a weight sensor, a pressure sensor, a temperature sensor, a thermal imaging sensor, an off-gassing sensor, a color sensor, a moisture sensor, an acoustic sensor, and a location sensor disposed at predetermined locations in the vehicle.

13. The method of claim 10, further comprising:
analyzes the sensed data and determines that one of the two or more perishable food items is damaged; and
transmits a message indicating cancellation of delivery for the damaged item.

14. The method of claim 10, wherein the order data includes a transaction amount, and the method further comprises:
selecting programmatically between the first navigation route and the second navigation route based at least in part on the transaction amount.

15. The method of claim 10, wherein the order data includes a loyalty factor for a customer, and the method further comprises:
selecting programmatically between the first navigation route and the second navigation route based at least in part on the loyalty factor.

16. The method of claim 10, wherein the delivery vehicle is a driverless automated vehicle.

17. The method of claim 10, further comprising:
retrieving and analyzing an expiration date and time for each of the two or more perishable food items; and
selecting programmatically between the first navigation route and the second navigation route based at least in part on the expiration date and time.

18. The method of claim 10, further comprising:
analyzing the sensed data to determine an interior temperature of a storage container in the vehicle, the storage container coupled to a cooling mechanism and containing at least one of the two or more perishable food items;
comparing the interior temperature with a predefined temperature; and
automatically activating the cooling mechanism of the storage container when the interior temperature is higher than the predefined temperature.

19. The method of claim 10, further comprising:
receiving a new delivery address for one of the two or more perishable food items;
updating the respective navigation route for the one of the two or more perishable food items based on the new delivery address.

20. The method of claim 10, further comprising:
determining an estimated arrival time for each of the first navigation route and the second navigation route; and
selecting programmatically between the first navigation route and the second navigation route based at least in part on the estimated arrival time.

* * * * *